March 30, 1937.　　H. J. ANDERSON　　2,075,755
FLUID PUMPING DEVICE
Filed Oct. 23, 1935　　3 Sheets-Sheet 1

INVENTOR
*Harry J. Anderson*
BY
*Edward H. Lang*
ATTORNEY

March 30, 1937.  H. J. ANDERSON  2,075,755
FLUID PUMPING DEVICE
Filed Oct. 23, 1935   3 Sheets-Sheet 3

INVENTOR
Harry J. Anderson
BY Edward H. Lang
ATTORNEY

Patented Mar. 30, 1937

2,075,755

UNITED STATES PATENT OFFICE 2,075,755

FLUID PUMPING DEVICE

Harry J. Anderson, Chicago, Ill., assignor to Hills-McCanna Company, Chicago, Ill., a corporation of Illinois Application October 23, 1935, Serial No. 46,370

6 Claims. (Cl. 184—27)

This invention relates to apparatus for pumping fluids and is more particularly concerned with force feed lubricators for use in lubricating motors and other mechanical equipment requiring positive lubrication.

Modern high speed and heavy duty motor mechanisms require positive lubrication in order to avoid frequent failure of parts and resulting loss of efficiency. In certain types of work, as for example, oil well drilling and pumping, expensive equipment is used, frequently on a rental basis, and it is essential that the equipment be operated with the greatest efficiency in order to keep operating costs within the limit of economic practicability. However, the power mechanism used in conjunction with this type of equipment is liable to break down on account of faulty lubrication. Not only are such break downs attended by much loss of time, but the maintenance cost on the mechanism is also excessive.

One of the objects of this invention is to provide an improved type of force feed lubricator which will insure the positive delivery of a predetermined amount of lubricant at regular intervals to the parts to be lubricated.

Another object of the invention is to provide a novel clutch mechanism for operating the lubricator.

A further object of the invention is to provide a special cam driving mechanism.

Still another object of the invention is to provide a novel plunger and plunger retaining device.

A still further object of the invention is to provide a novel stroke adjusting device.

Broadly this invention comprises a plunger type feeding device which is operated in such manner that the suction stroke is comparatively slow with a pause at the end thereof in order to allow sufficient time for the plunger barrel or cylinder to accurately draw in a predetermined quantity of lubricant, and the discharge stroke is rapid in order to insure the minimum amount of leakage and the maximum delivery of lubricant to the parts intended to be lubricated. The apparatus is so constructed as to permit easy access to the working parts in order that adjustment and replacement of operative parts can be made with minimum amount of disturbance of the apparatus. In accordance with the invention, a single casing or container is fitted with a plurality of pumping units so arranged that any unit may be replaced without stopping the operation of the entire lubricator. Each lubricator unit is equipped with a dash pot which enables the apparatus to operate silently with little or no jarring and hammering of working parts. A novel construction has been devised to retain the plunger in the desired position during operation and also to prevent the plunger from falling into the casing during removal of the pumping unit. The stroke of the plunger can be adjusted exteriorly without disturbing the operation of the lubricator whereby to vary at will the quantity of lubricant to be fed. Motion is transmitted to the lubricator units by a cam shaft driven through a clutch mechanism which is capable of preventing reverse rotation of the shaft.

The foregoing, as well as other objects and advantages of the invention, will be evident from the following detailed description considered in conjunction with the accompanying drawings, of which Fig. 1 is a vertical horizontal cross-sectional view of the lubricator embodying the novel features of the invention.

Figure 1:
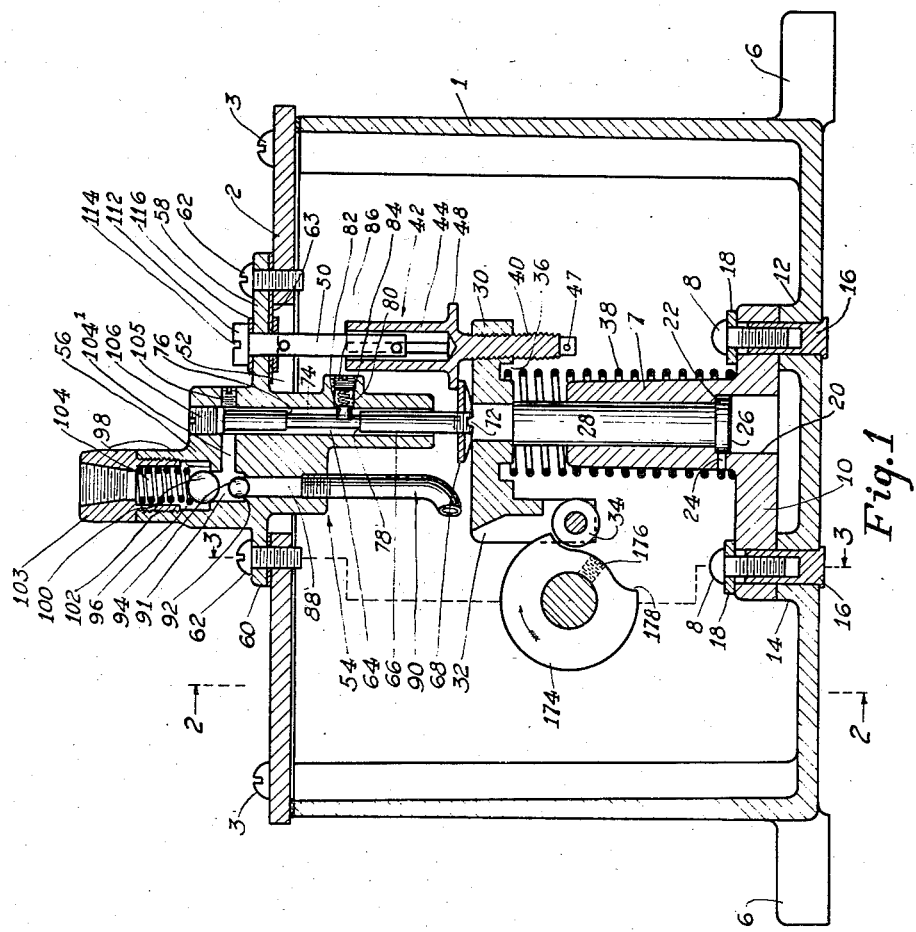
Figure 2:
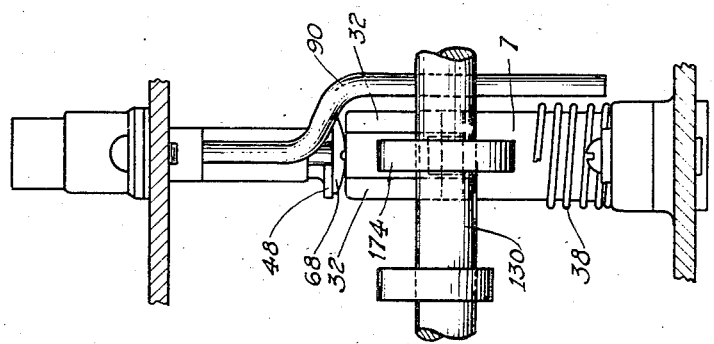
Fig. 2 is a vertical diagrammatic view of a portion of the device shown in Fig. 1, looking in the direction of the arrows 2—2.
Figure 3:
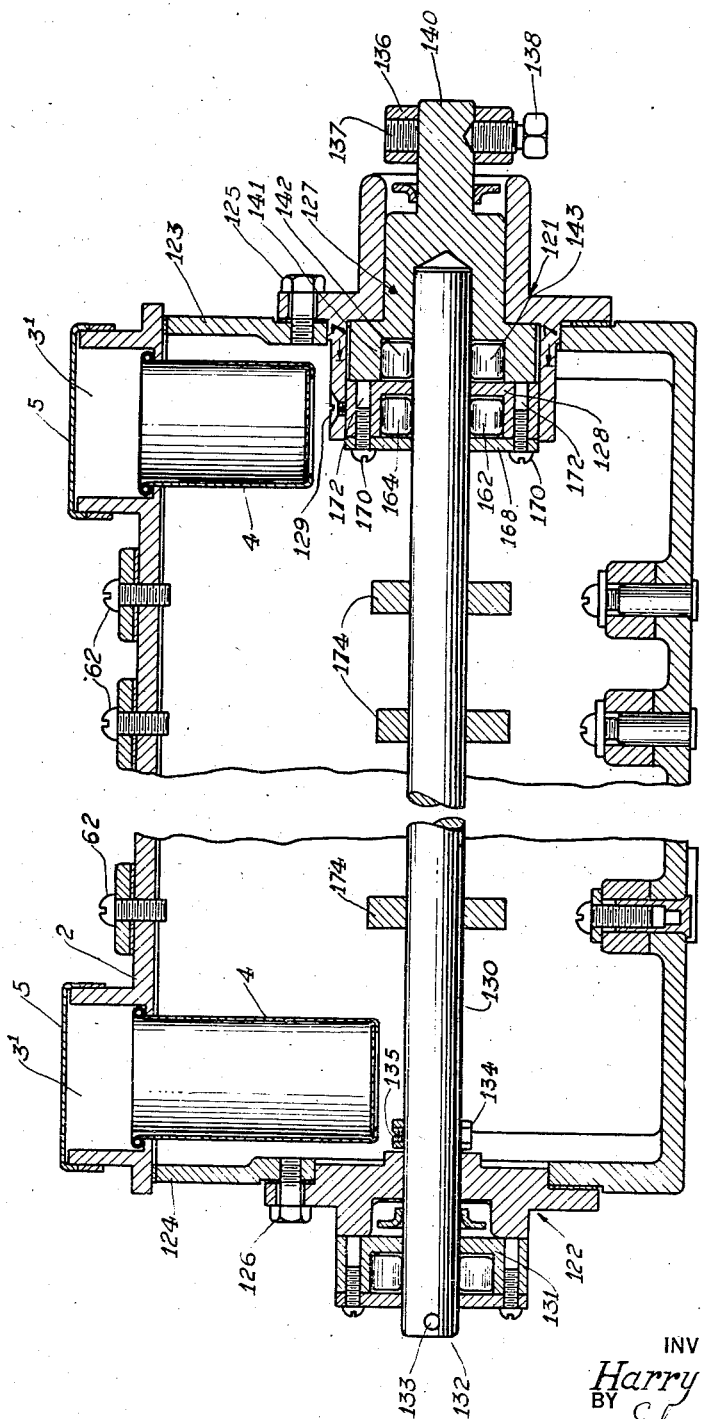
Fig. 3 is a fragmentary vertical, longitudinal cross-sectional view of the device taken on the line 3—3 of Fig. 1.

Referring to the drawings, particularly Figures 1 and 2, the numeral 1 indicates a rectangular shaped box or casing, preferably made of steel or other metal or alloy, and adapted to act as a reservoir for lubricant or other fluid. A top 2 is adapted to cover the casing and is held in place by screws 3 which screw into bosses cast as a part of the inner side walls of the casing. The top has openings 3' at either end thereof into which fit the screens 4. The openings are covered by lids 5 which may be suitably hinged at one end thereof. The casing may be filled with lubricant through these openings. The casing is adapted to be mounted rigidly to a foundation by means of the ears 6 which are pierced with holes through which bolts may be passed.

The piston barrel 7 is mounted inside the casing and fastened to the bottom thereof by means of the screws 8 which pass through the plate 10 forming an integral part of the barrel. The inner wall of the bottom of the casing is formed with two upstanding parallel ridges 12 and 14 upon which the plate 10 is adapted to rest. The nuts 16 are adapted to pass through holes in the bottom of the casing and partially through the holes in the plate 10. The nuts 16 fit snugly in the bottom and plate holes and thereby properly line up the piston barrel when it is inserted. The nuts 16 are suitably threaded to receive the screws 8. Lock washers 18 keep the screws 8 from becoming loosened.

The lower end 20 of the piston barrel is larger in diameter than the main portion of the barrel, thereby forming a shoulder 22. A passageway 24 connects the space outside the piston barrel to the upper end of the enlarged portion of the barrel. The passageway 24 is slightly below the shoulder 22, thereby forming a dash pot in conjunction with the flange 26 on the lower end of the piston 28. The flange fits snugly in the enlarged portion 20 of the barrel and the piston 28 fits snugly in the main portion of the barrel. The passageway 24 is arranged to trap a small volume of oil between the shoulder 22 and the upper face of the flange 26, thereby cushioning the up-stroke of the piston.

A plate 30 is rigidly mounted on the upper end of the piston 28 by being screwed or pressed thereon. The plate has a downwardly extending bifurcated arm 32 having a roller 34 mounted between the lower ends thereof. The arm 32 is preferably forged or cast as an integral part of the plate 30. The under side of the plate 30 has an annular groove 36 to receive the upper end of the coil spring 38. The spring surrounds the piston barrel 7 and abuts at its lower end against the upper face of the plate 10.

Figure 5:
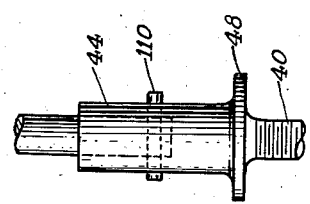
Fig. 5 is a fragmentary diagrammatic view of the element shown in Fig. 4, looking in the direction of the arrows 5—5.
Figure 4:
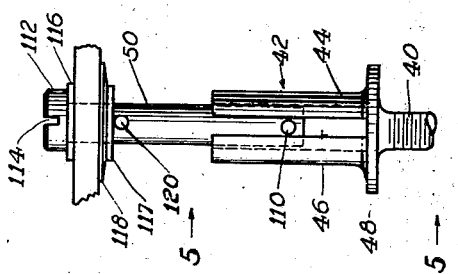
Fig. 4 is an enlarged vertical diagrammatic view of an element of the device shown in Fig. 1.

The end of the plate 30, opposite that from which the arm 32 extends, has a threaded passageway therethrough to receive the lower threaded end 40 of the adjusting mechanism indicated generally by the numeral 42. The member 42 is more clearly shown in Figures 4 and 5. The upper portion 44 of the member 42 has a longitudinal cylindrical bore and a diametrical slot 46 extending the entire length of the bore. A stop pin 47 is tightly pressed in the lower end 40 of member 42 to prevent the member 42 from being screwed entirely out of the plate 30. Intermediate the threaded portion 40 and the portion 44 is a lip 48. The member 42, together with the rod member 50, forms the means for adjusting the stroke of the pump plunger.

The top or cover 2 of the casing has spaced openings 52 to permit the pumping units indicated generally by the numeral 54 to be inserted therethrough. The main body 56 of the pumping units may be forged or cast from suitable metal or alloy such as brass. The bodies 56 are formed with lips 58 and 60 having holes therein through which the screws 62 may be inserted and the pumping unit screwed tightly to the top 2. A suitable gasket 63 may be placed between the top and the pump body to prevent leakage. The pumping unit body is adapted to completely close the openings through which it is inserted.

The body of the pumping unit is formed with a relatively long vertical cylinder 64 in which a plunger 66 is snugly and slidably mounted. A plate 68, preferably of circular shape, is rigidly mounted on the lower end of the plunger 66, as for example, by being screwed or pressed thereon. The under face of the plate 68 is grooved at 70 and 72 to prevent the plate from adhering to the piston 28 and plate 30 by suction. The diameter of the plate 68 is sufficiently great to underlap the lip 48 of the adjusting member 42.

A section 74 of the plunger 66, intermediate the ends thereof, is of smaller diameter than the remainder of the plunger, thereby forming shoulders 76 and 78. The length of the section 74 is greater than the length of the maximum plunger stroke. The pump body is bored at 80 to permit the insertion of the friction member 82 and coil spring 84. The outer end of the bore 80 is threaded to receive the retaining plug 86. The face of the member 82 in contact with the section 74 of the plunger is preferably shaped to fit the contour thereof. The coil spring 84 presses the member against the section 74 with sufficient force to prevent the plunger 66 from dropping merely by the force of gravity. The member 82 furthermore serves to prevent the plunger from dropping out of the pump unit into the bottom of the casing when it is desired to remove the unit, by engaging against the shoulder 76.

The pump body is bored to form passageway 88 which is threaded at its lower end to receive the pipe 90. The pipe 90 extends to the lower part of the casing. The passageway 88 is counter-bored at 91 to form valve seat 92. The ball valve 94 is adapted to seat on the seat 92. The passageway is further counter-bored at 96 to form valve seat 98 upon which the ball valve 100 is adapted to seat. The upper end of the passageway is threaded at 102 to receive an adapter 103 which permits the lubricator to be connected by means of a pipe line (not shown) to the mechanism to be lubricated. A light coil spring 104, held in place by the adapter 103, normally holds the ball valve 100 in closed position. The passageway 88 is connected at a point intermediate the ball valves 94 and 100 by means of the passageway 104' with the upper end of the cylinder 64. The outer end of the passageway 104' is threaded and closed by the screw plug 105. The upper end of the cylinder 64 is threaded and adapted to be closed by the threaded plug 106.

The lip 58, forming part of the pump body, has a hole bored therethrough directly above the member 42 to receive the rod 50. The lower portion of the rod 50 is adapted to be received in the cylindrical bore of the member 42. A pin 110 is rigidly wedged in the rod 50 adjacent the bottom thereof and the pin is adapted to slide in slot 46. The upper end of the rod is formed with a head 112, preferably recessed at 114 to enable the rod to be turned by means of a screw driver or similar tool. A washer 116 is placed on the rod between the head 112 and the cover 2. A friction washer 118 is placed on the rod immediately below the cover 2 and is held in frictional engagement with the lower face of the cover by the washer 117 and the retaining pin 120. The friction washer prevents the rod from turning freely. It will be evident that by turning the head 112 of the rod 50, the member 42 can be screwed upwardly or downwardly.

Bearing members 121 and 122 are mounted in openings in the end walls 123 and 124 respectively of the casing and are held in place by bolts 125 and 126. The clutch indicated generally by the numeral 127 is rotatably mounted in the bearing 121, and a second clutch member 128 is mounted in the bearing 121 immediately inside the clutch 127. The clutch 128 is held in stationary position by means of the set screw 129. The cam shaft 130 is journalled in the bearing 122 at one end and in the clutch member 127 at the other. Another clutch member indicated generally by the numeral 131 is rotatably mounted on the end 132 of the shaft 130. The clutch 131 is held on the shaft contiguous to the outer portion of the bearing 122 by means of the retaining pin 133. A collar 134 is rigidly mounted by means of the set screw 135 on the shaft 130 immediately inside the bearing 122. The collar prevents the shaft sliding in an axial direction. A second collar 136 is rigidly mounted by means of the screw 138 on the end 140 of the clutch member 127. The collar 136 is tapped at 137 to permit a drive arm (not shown) to be screwed therein. The arm may be reciprocated by any suitable source of power.

Figure 7:
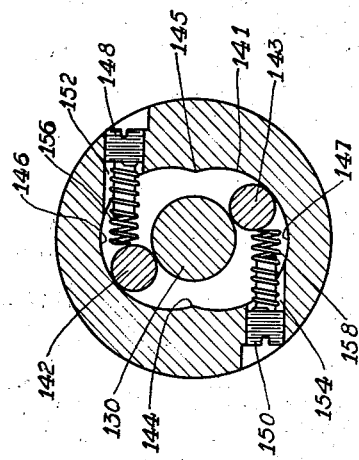
Fig. 7 is an enlarged cross-sectional view taken on the line 7—7 of Fig. 3 showing a part of the clutch mechanism.
Figure 8:
Fig. 8 is an enlarged perspective view of a roller forming part of the clutch mechanism.
Figure 6:
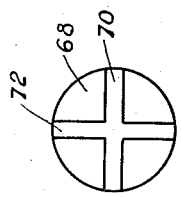
Fig. 6 is an enlarged bottom plan view of another element shown in Fig. 1.

Referring more particularly to Figure 7, the clutch body is counter-bored at 141 to enable the rollers 142 and 143 to be inserted between the clutch and the shaft. It will be noted that that portion of the clutch body which is adapted to contain the rollers 142 and 143, is shaped in such manner as to form an upper and a lower curved area substantially conforming to the arc of a circle whose center lies on the diameter of the shaft between the center and the circumference thereof. The space between the shaft and the points 144 and 145 is narrower than the diameter of the roller, whereas the space between the shaft and the points 146 and 147 is greater than the diameter of the roller. The screw plugs 148 and 150 are adapted to be screwed into the passageways 152 and 154 respectively, and the coil springs 156 and 158 are adapted to encircle the inner portion of the screw plugs and press against the rollers 142 and 143 respectively and hold them in substantially the position shown in Figure 7. It will be seen, therefore, that if the clutch is rotated in a clockwise direction, the roller jams between the shaft and the clutch body thereby forcing the shaft to turn, whereas when the clutch is rotated or reciprocated counter-clockwise, the clutch body is able to move without moving the shaft.

The holding clutch member 128 has rollers 162 and 164. An end plate 168 is fastened to the inner surface of the clutch 128 by means of the screws 170 which are adapted to screw into the threaded passageways 172 of the clutch body. The clutch 128 correspods to the clutch member 127 insofar as its manner of operation and structure is concerned. The purpose of this clutch member is to prevent the shaft 130 from rotating in the direction opposite to that in which it is turned by the clutch member 127. The clutch 131 on the opposite end of the shaft corresponds precisely to the clutch member 128 and is shown in cross section in Figure 7. The outer surface thereof is preferably formed with a recess into which a rod can be inserted by means of which the clutch can be rotated by hand. The purpose of the clutch member 131 is to enable the shaft 130 to be rotated by hand when the lubricator is not in action in order to place any desired pumping unit in such position that it can be adjusted or removed. Moreover, the hand operated clutch member 131 serves to rapidly fill the discharge lines when the lubricator is initially placed in operation, and also may be used to temporarily operate the lubricator at a more rapid rate.

At predetermined intervals on the shaft 130, the cams 174 are fastened thereto by means of the set screws 176. The cams 174 are adapted to coact with the rollers 34 for the purpose of operating the pumping mechanism. The cams may be arranged to cause the various pumping units to discharge in any desired order. The cams are arranged and shaped in such a manner as to impart substantially vertical thrust to the roller 34 during rotation thereof and hold the piston 28 in its lower position for a sufficient interval of time to permit the pump barrel to be entirely filled with fluid. By means of the particular type of cam shown, side thrust on the piston 28 is to a large extent eliminated. It will be noted that the suction stroke takes place during a minor portion of the rotation of the cam and the piston is held in retracted or suction position during a comparatively long portion of the rotation of the cam. Discharge takes place during approximately 90 degrees of rotation. It will be apparent, however, that the shape of the cam may be varied to obtain maximum efficiency of the particular pumping mechanism. It is desirable to avoid the simple harmonic motion of the ordinary cam.

The operation of the device is as follows:

By reciprocating the drive arm screwed into the collar 136, the shaft 130 is rotated in a clockwise direction through the clutch member 127. The cams 174, after reaching the position shown in Figure 1, depress the arm 32 and the piston 28 of the respective lubricator units. The lip 48 on the member 42 engages the plate 68 attached to the lower end of the plunger 66 and pulls the plunger downwardly therewith. The downward movement of the plunger sucks lubricant through the pipe 90 past the check valve 94 into the upper portion of the barrel 64. The depression of the piston 28 permits oil to flow through the passageway 24 into the lower portion of the piston barrel above the flange 26. During the portion of the rotation of the cam 174 when the circular periphery engages the periphery of the roller 34, the piston 28 is retained in its depressed position, giving the oil sufficient time to fill the barrel 64. When the cam has rotated sufficiently so that the point 178 engages the roller 34, the roller is suddenly disengaged by the cam and the coil spring 38, which has been placed under tension by the depression of the plate 30, rapidly pushes the piston 28 upwardly against the plate 68 thereby forcing the plunger 66 upwardly and feeding the oil out of the plunger barrel past the check valve 100.

The length of the plunger stroke 66 is adjusted by rotating the head 112 of the rod 108. By screwing the member 42 upwardly, the length of the plunger stroke is shortened, whereas by screwing it downwardly, the plunger stroke is lengthened. As shown in Figure 1, the mechanism is so adjusted as to give maximum plunger stroke.

It will be apparent that if any pumping unit becomes faulty it may be easily removed by merely removing the screws 62 and lifting the pumping unit out of the casing. It is merely necessary to tilt the pumping unit slightly to disengage the plate 68 from under the lip 48. Likewise, the piston barrel 7 may be easily removed by removing the screws 8 and lifting the entire barrel and piston out through the top opening. It is therefore obvious that the use of any pumping unit may be discontinued while others remain in operation.

It will be seen therefore that the invention provides pumping mechanism which is notable for its flexibility and for the accuracy and positiveness of operation. It is furthermore so constructed that those parts which have a tendency to wear more rapidly can be easily removed and replaced at a very small cost thereby giving long life to the mechanism as a unit.

What is claimed is:

1. A force feed lubricator comprising a casing having a top and bottom, a pump actuating unit comprising a cylinder, and a piston rigidly mounted on said bottom, a pump unit rigidly mounted on said top in operative relation to said actuating unit, and means for removing said pump unit from said casing independently of said actuating unit.

2. A force feed lubricator comprising a casing having a top and bottom, a cylinder rigidly mounted on said bottom, a piston slidably mounted in said cylinder, means to reciprocate said piston, a pumping unit separate from said piston, rigidly mounted on said top, said pumping unit having a barrel and a plunger slidably mounted therein, and means for reciprocating said plunger by means of said piston.

3. A force feed lubricator comprising a casing, a cylinder mounted therein, said cylinder being counter-bored at one end to form a shoulder, a piston slidably mounted in said cylinder and having an enlarged end to fit snugly in the end of said cylinder which is counter-bored, a passageway through the cylinder wall spaced slightly from said shoulder and connecting the interior of the counter-bored end of the cylinder to the interior of the casing, actuating means for performing the suction stroke of said piston, a coil spring arranged to perform the delivery stroke of said piston, and a pumping unit arranged to be actuated by said piston.

4. A pumping mechanism comprising a barrel and a spring actuated plunger slidably mounted therein, an arm rigidly mounted on said plunger, a roller mounted on said arm, a cam shaft, a cam rigidly fixed on said shaft in operative engagement with said plunger to perform the suction stroke thereof, said cam having the major portion of its periphery of circular outline and concentric with the axis of rotation of said shaft, and the remaining portion of its periphery at a smaller radial distance from the center of the shaft than said major portion, said shaft and said cam being positioned to allow unobstructed travel of said plunger during the delivery stroke thereof when said circular periphery does not engage said roller.

5. A force feed lubricator comprising a casing having a top and bottom, a cylinder rigidly mounted on said bottom, a piston slidably mounted in said cylinder, means to reciprocate said piston, a pumping unit rigidly mounted on said top, said pumping unit having a barrel and a plunger slidably mounted therein, said plunger having a section of reduced cross-sectional area, said section being of greater length than the maximum plunger stroke, a shoulder at the upper end of said section, and a removable frictional member resiliently engaging said section, said pumping unit being removable independently of said piston.

6. A force feed lubricator comprising a casing, a cylinder mounted rigidly on one side of said casing, a piston slidably mounted in said cylinder, means to reciprocate said piston, a pumping unit rigidly mounted on the opposite side of said casing in operative relation to said piston, said pumping unit having a barrel with a plunger slidably mounted therein, means for adjusting the stroke of said plunger without changing the stroke of said piston, and means for removing said pumping unit without disturbing said piston.

HARRY J. ANDERSON.